United States Patent [19]

Hixon

[11] Patent Number: 5,099,932
[45] Date of Patent: Mar. 31, 1992

[54] ROCK DRILL BIT LUBRICANT CIRCULATING SYSTEM

[75] Inventor: Charles E. Hixon, Huffman, Tex.

[73] Assignee: Cummins Engine Company, Inc., Columbus, Ind.

[21] Appl. No.: 631,876

[22] Filed: Dec. 21, 1990

[51] Int. Cl.⁵ .......................................... E21B 10/24
[52] U.S. Cl. ................................. 175/229; 175/371; 184/31; 384/93
[58] Field of Search ............. 175/229, 228, 227, 371, 175/372; 384/93; 184/31, 35

[56] References Cited

U.S. PATENT DOCUMENTS

| | | | |
|---|---|---|---|
| 1,456,461 | 5/1923 | Page | 184/31 X |
| 1,909,128 | 5/1933 | Scott et al. | 384/93 X |
| 3,244,459 | 4/1966 | Ortloff | 175/229 X |
| 3,407,741 | 10/1968 | Weber et al. | 184/31 X |
| 4,167,219 | 9/1979 | McQueen | 175/372 X |
| 4,167,220 | 9/1979 | Ernst et al. | 175/337 |
| 4,181,185 | 1/1980 | Keller et al. | 384/93 |
| 4,240,674 | 12/1980 | Evans | 308/8.2 |
| 4,412,590 | 11/1983 | Daly | 175/229 |
| 4,446,933 | 6/1984 | Bodine | 175/229 |
| 4,501,338 | 2/1985 | Underwood | 175/229 |

FOREIGN PATENT DOCUMENTS

| | | | |
|---|---|---|---|
| 250217 | 8/1912 | Fed. Rep. of Germany | 184/31 |
| 926222 | 5/1982 | U.S.S.R. | 175/371 |

Primary Examiner—Hoang C. Dang
Attorney, Agent, or Firm—Sixbey, Friedman, Leedom & Ferguson

[57] ABSTRACT

The present invention provides a lubricant circulation system for a rock drill bit which circulates a flow of lubricant over the bit bearing surfaces to keep the bearings optimally lubricated and free to particulate contaminants from the drilling process. A lubricant pumping assembly, including a pair of nested gerotor pump elements is attached to either the drill bit cutting element or support structures so that one of the gerotors is driven by rotation of the bit cutting element or related structures and the other gerotor rotates freely. The gerotors have a corresponding tooth and recess configuration that pulls lubricant from the lubricant supply under positive pressure into a variable sized cavity formed as the gerotors rotate relative to each other and then forces lubricant to the bearing surfaces. Lubricant may optionally be pumped back to the lubricant supply with continued rotation of the gerotors or out of the journal area with the drilling cuttings for return to the surface.

21 Claims, 5 Drawing Sheets

ROCK DRILL BIT LUBRICANT CIRCULATING SYSTEM

TECHNICAL FIELD

The present invention relates generally to drill bits for penetrating rock and other geological formations and specifically to a lubricant circulating system for a rock drill bit.

BACKGROUND OF THE INVENTION

Rotary rock drill bits have long been used in the petroleum and mining industries to drill for oil and minerals located in or below rock formations. These bits have also been employed by a different segment of the well drilling industry to drill wells for water. Many of the earth formations encountered during these operations are quite hard and subject the drill bit to severe stress. Moreover, the drill hole is usually quite narrow in diameter at the bottom in comparison to the diameter of the top, and this configuration subjects the bit to forces from several directions during the course of drilling operations. Proper lubrication of the bit's rotary elements and their bearing structures is essential if the bit is to perform optimally in such an environment.

The drill bits most suitable for this kind of drilling usually include three cutter cones rotatably mounted on journals attached to a bit body so that the axis of each cone is oriented near the center of the bit, and the teeth located in concentric rings on the face of each cone intermesh with the teeth on adjacent cones to provide the chipping and crushing action required to cut through the earth formation being drilled and create the drill hole. The typical bit body employed to support the cutter cones is rotatably attached to one end of a drill pipe and includes a body portion with three depending leg sections, each of which has bearing and support structure for rotatably mounting a cutter cone which is secured to a journal.

Viscous drilling "mud" is fed to the bit body through the drill string to cool the drill bit, which would otherwise be heated by the friction created during drilling. The mud is also used to wash the comminuted rock away from the drill bit cutting elements.

The drill bit cutting elements or cutter cones must rotate continuously during drilling operations to effectively drill through most rock formations. As a result, unless the bearings and support structures of the bit body are properly lubricated, the rotatably mounted cutter cones will not be able to rotate and will quickly become immobilized because of the frictional energy generated between the cone interiors and their supports. If this happens, the drill bit will not be capable of drilling. Consequently, the maintenance of optimally lubricated rotating cutter elements and their corresponding bearings is critical to rock drill bit performance. Even with proper lubrication, the average bearing life of available rock drill bits usually ranges from about 200,000 to about 570,000 revolutions, or 60 to 80 hours.

Moreover, even when the bearing surfaces of the rotating drill bit cutter elements are adequately lubricated, particulate materials, such as bits of rock and the like, may find their way to the cutter element bearing surfaces and into the lubricant. The presence of these contaminants in the lubricant could irreparably damage the bearing surfaces so that the cutting elements cannot rotate properly. For optimum drill bit operation, therefore, the drill bit cutting elements must not only be kept properly lubricated with an optimum supply of lubricant, but the lubricant must also be kept free of potentially damaging contaminants. Because the average rock drill bit bearing has a service life of only about 200,000 to 570,000 revolutions, the provision of adequate lubrication to the bearings and the elimination of wear-producing contaminants will increase bearing life and, therefore, the effective drilling time of the bit.

The prior art has proposed lubrication systems for rock drill bits which are designed either to provide an adequate supply of lubricant to the cutting element bearing surfaces, to reduce or eliminate particulate contaminants from the lubricant or both. However, the available systems, of which those disclosed in U.S. Pat. Nos. 4,167,220; 4,240,674; 4,412,590 and 4,446,933 are examples. These patents all disclose lubrication systems for rock or earth boring drill bits which suffer from limitations or disadvantages.

The lubrication system described in Pat. No. 4,446,933 to Bodine includes structure that rotates with the rotary cutting cones and uses the centrifugal force generated by rotation of the bit to drive particulate contaminants outwardly away from the bearings. A chamber divided by a floating piston in the bit body provides lubricant under pressure to the cone bearing surfaces in response to a pressure differential in the chamber created by the accumulation of drilling mud and water containing the contaminants on the opposite side of the piston from the lubricant. This system may effectively direct particulate contaminants away from the cone bearing surfaces as the bit rotates. However, the maintenance of an adequate supply of lubricant during bit operation is totally dependent on the accumulation of sufficient fluid in the chamber to produce the pressure differential to circulate lubricant to the cone. If the fluid passage between the cone and the fluid chamber becomes blocked with particulate contaminants, sufficient fluid will not be available to produce the necessary pressure differential.

Pat. No. 4,412,590 to Daly discloses an internal lubricant pump which includes an elastomeric member that moves across a grooved rigid surface during bit operation to circulate lubricant to the cone bearings. As the bit rotates, lubricant is pumped in a direction that depends on the configuration of the seal and grooves. This arrangement may provide an adequate supply of lubricant to the cone bearings when the seal and grooves have an optimum configuration. However, the system described in this patent will not effectively remove particulate contaminants from the lubricant. As a result, the groove configuration is likely to be eroded by the presence of hard particulate contaminants so that lubricant distribution will be adversely affected.

The "corkscrew" grooves for flushing lubricant past the bearings described in Pat. No. 4,167,220 does not reliably produce a pressure differential adequate to produce the kind of pumping action needed to keep all of the bearing surfaces fully lubricated. Lubricant is merely agitated and the flow is not forced. As a result, this system does not effectively remove particulate contaminants from contact with the cone bearings.

The drill bit cone lubricant assembly disclosed in Pat. No. 4,240,674 includes a complex arrangement of springs and other elements which function to force lubricant to the cone bearing structures. Although this system may keep the bearings adequately lubricated when all of the elements are functioning properly, the number of elements and complexity of their arrangement increases the likelihood that the harsh drilling environment will quickly damage components of this system. There is no provision in this system, moreover, for removing particulate contaminants.

Many of the known lubricant pumping elements for rock drill bits, moreover, are too delicate to withstand the high drill bit rotational revolutions per minute (rpms) or high lubricant viscosity typically encountered in drilling operations. Consequently, there is a need for a strong, but simple, lubrication system with a minimum number of moving parts for a rock drill bit that effectively provides lubricant to the cutter cone and its associated bearing surfaces during bit rotation. There is also a need for a simple lubrication system for a rock drill bit that additionally effectively removes particulate contaminants from the lubricant so that these contaminants do not contact and damage the cutter cone or other bit bearing surfaces.

SUMMARY OF THE INVENTION

It is a primary object of the present invention, therefore, to overcome the disadvantages of the prior art discussed above and to provide a lubrication system for a rock drill bit capable of extending bit service life.

It is another object of the present invention to provide a lubricant circulating system for a rock drill bit that effectively circulates a supply of lubricant to the bit bearing structures during bit operation to properly lubricate and to flush contaminants from the bearing structures.

It is still another object of the present invention to provide a rock drill lubricant circulating system for each cutting element which forcibly circulates a defined quantity of lubricant over the cutting element bearing structures as the bit cutting elements rotate during bit operation.

It is yet another object of the present invention to provide a rock drill bit lubricant circulating system employing a rotary pump assembly which includes a single freely rotating element that rotates eccentrically relative to a driven rotating element associated with each cutting cone to force a quantity of lubricant over the cone bearing surfaces.

It is a further object of the present invention to provide a rock drill bit bearing lubrication system wherein lubricant flow to the bearings is directly controlled by bearing movement.

It is yet a further object of the present invention to provide a rock drill bit lubricant system that employs positive pressure bearing lubrication so that lubricant flow in the event of a leak will keep contaminants away from the bearing structures.

The aforesaid objects are achieved by providing a rock drill bit lubrication circulating system which is powered by rotation of the drill bit to circulate lubricant across the drill bit bearing surfaces. The drill bit lubricant circulation system includes a lubricant circulation assembly associated with each of the bit cutting elements which circulates lubricant over the bearing surfaces in the bit cutting element. The assembly optionally includes a lubricant reservoir to hold a quantity of lubricant to be circulated to a lubricant circulation assembly and then to the cutting element bearings. A lubricant supply channel may direct lubricant from a lubricant supply or lubricant reservoir to the circulation assembly, and a lubricant return channel may be provided to direct lubricant from the bearings back to the lubricant supply. The lubricant circulation assembly, which includes a pump powered by the rotation of the cutting element during bit operation, forces lubricant from the lubricant supply over the bearing surfaces and may, optionally, pump lubricant back to the supply.

The pump includes a pair of nested eccentric rotors. One of the rotors is concentric and coaxial with the cutting element and rotates with the cutting element to move lubricant across the cutting element bearings through cavities formed in the pump by changes in the relative configurations of the rotors during rotation. The cavities hold a defined quantity of lubricant, which is circulated through the pump over the bearings. Lubricant that has circulated over the bearings may be recirculated directly back through the pump or, alternatively, it may be collected in a return channel and directed back to the lubricant supply where the lubricant is then available to be pumped back through the lubricant circulation system. A constant supply of lubricant is thus provided to the bit bearing surfaces.

Other objects and advantages will be apparent from the following description, claims and drawings.

BEST MODE OF CARRYING OUT THE INVENTION

Rolling cutter cone rock drill bits of the type to which the present invention pertains have three major components: the cutting elements, the bearings which rotatably support the cutting elements and the bit body. The cutting elements or cutter cones are typically formed on cone-shaped supports and include circumferential rows of teeth which are positioned to interfit between the rows of teeth on adjacent cutter cones. The bit body includes a leg section for each cutter cone to which is attached a journal which supports the bearings. The bit body further includes a threaded connection for attaching the bit body to the drill stem, lubricant reservoirs and conduits for the flow of drilling fluid. In addition to supporting the cutting elements, the bit body directs drilling fluid supplied to it through the drill stem to the bottom of the hole and to cutters to keep the area being drilled and the cutters clean and to reduce the temperature of the cutters.

During drilling operations a rock bit is subjected to severe stress and substantial adverse forces, particularly if the drilling is being conducted in a hard rock formation. The stresses created on the bit may interfere with cone rotation and wear or even break the cones. The bearing surfaces which rotatably support the cones are also subject to wear as a result of these adverse forces. Bit manufacturers typically recommend weights and rotary speeds for each type of drill bit which, if followed, will minimize bit wear. If these operation parameters are not followed, however, wear of the bit components will be accelerated. In addition, other factors, such as encountering an unexpectedly hard rock formation, an obstruction in the hole, improperly functioning hydraulics, or the driller's interest in optimizing total rig cost, can also accelerate bit wear or even cause bit failure. Moreover, inadequate lubrication of the bit moving parts during bit operation will ultimately produce bit failure.

The lubricant circulation system of the present invention maximizes bit useful life and avoids the wear of bit components attributable to inadequate lubrication and contamination of the lubricant with dirt, rock or other drilling by-products. Not only does the present system direct an adequate supply of lubricant to the cutter cone bearing structures, but this lubricant supply is circulated during bit operation, thereby avoiding the build up of particles of rock and other solid materials that could damage the bearing surfaces and cause the bit to fail.

Figure 1:
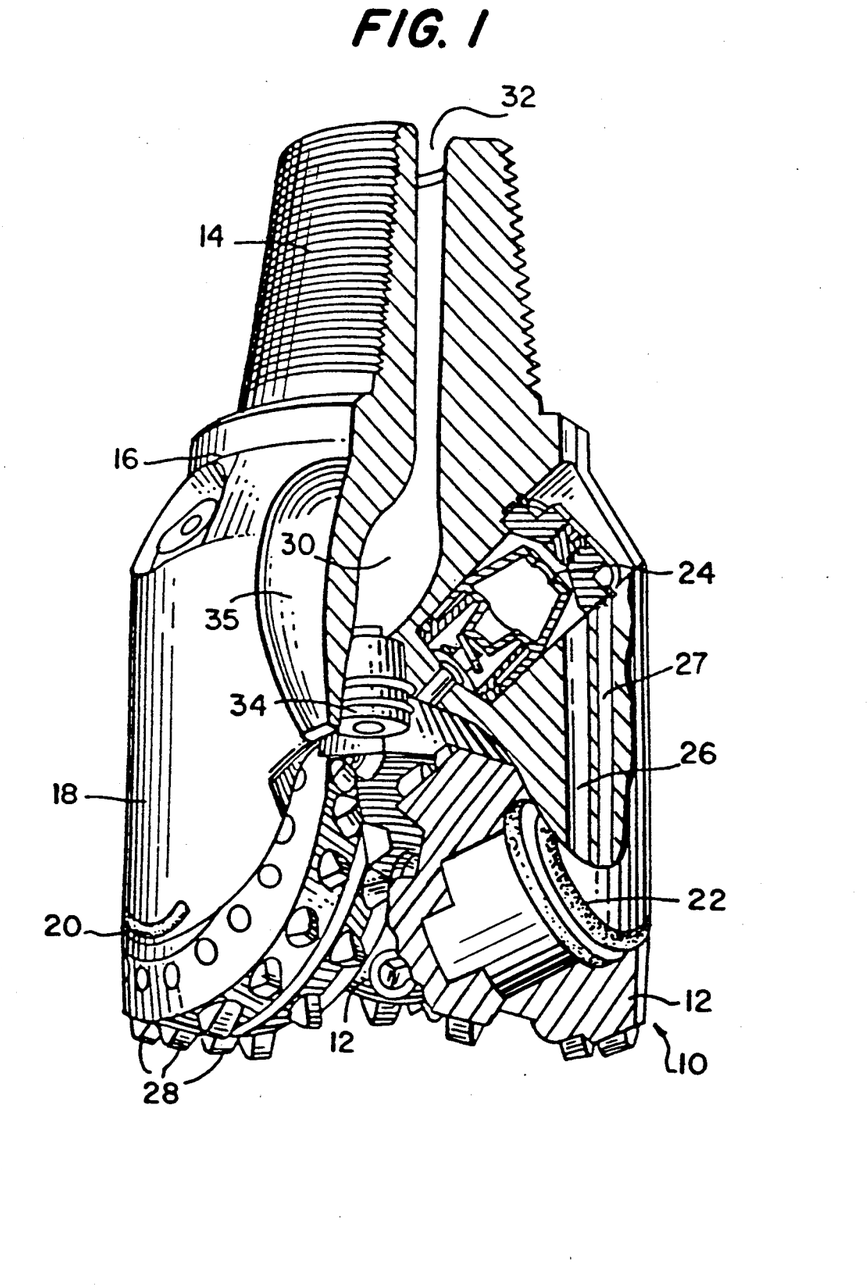
FIG. 1 is a partially cut away perspective view of a rock drill bit showing a cutting element mounted on a journal leg.

Referring to the drawings, FIG. 1 illustrates, in broken side perspective view, a rock drill bit 10. Although the rock drill bit illustrated and discussed herein has three cones 12, the lubricant recirculation system of the present invention may be used with a drill bit having two cones. A threaded drill stem connector 14 is located at the opposite end of the bit from the cones 12. The threaded connector 14 is engaged by a correspondingly threaded drill string or stem (not shown) which extends upwardly from the bottom of the bore hole being drilled by the bit 10 to the earth's surface where it is connected to a drilling rig (not shown).

The threaded connector 14 is part of the bit body 16, which supports three substantially identical leg extensions 18, which, in turn support the three cones 12. The bit body 16 is caused to rotate about a central axis by the drill stem during drilling operations. Each leg extension 18 includes an outer shirttail portion 20 which may also form the external annular gage surface of the bit. The shirttail portion 20 additionally includes journal mounting structure (not shown) which attaches a journal leg 22 to the bit leg extension. Each cone 12 is rotatably mounted on a journal leg 22.

A lubrication supply source 24 for providing lubricant to the journal bearing surfaces is contained within the bit body 16 as shown in FIG. 1. A lubricant supply channel 26 formed in each leg extension 18 provides fluid communication between the lubricant supply source 24 and the journal leg to supply lubricant to the journal leg during drilling operations. A lubricant return channel 27 is also provided to direct lubricant from the cone bearing structures (not shown) back to the lubricant supply source.

Each cone 12, which is rotatably mounted on a journal leg 22, includes cutting teeth 28 which are arranged on the outer surface of each cone in circumferential rows so that the surface of the cone may contain several rows of teeth. The rows of teeth of adjacent cones must be spaced so that optimum intermeshing and interaction of the teeth can occur as the cones rotate on their journal legs during drilling. The pattern and location of the teeth 28 is unique for each type of cone so that these cutting structures will disintegrate the rock formation as the bit is rotated within the hole. The material from which the cutting teeth 28 are formed will directly affect the useful life of the rock drill bit 10. If a single tooth breaks or becomes very worn, the remaining teeth will be overloaded and wear more quickly. Therefore, it is preferred to employ teeth formed either from sintered tungsten carbide alone or tungsten carbide combined with other alloys.

The bit body 16 further includes a central channel 30 coextensive with the axis of rotation and the central longitudinal axis of the drill bit which communicates at one end through a port 32 with the drill stem (not shown) and which may terminate at the opposite end in a plurality of jet nozzles 34, only one of which is shown in FIG. 1. Drilling fluid can then enter the bit body from the drill stem (not shown) through port 32 and pass downwardly through channel 30 to be discharged through nozzle 34. A nozzle housing 35 may be formed integrally with the bit body.

Figure 2A:
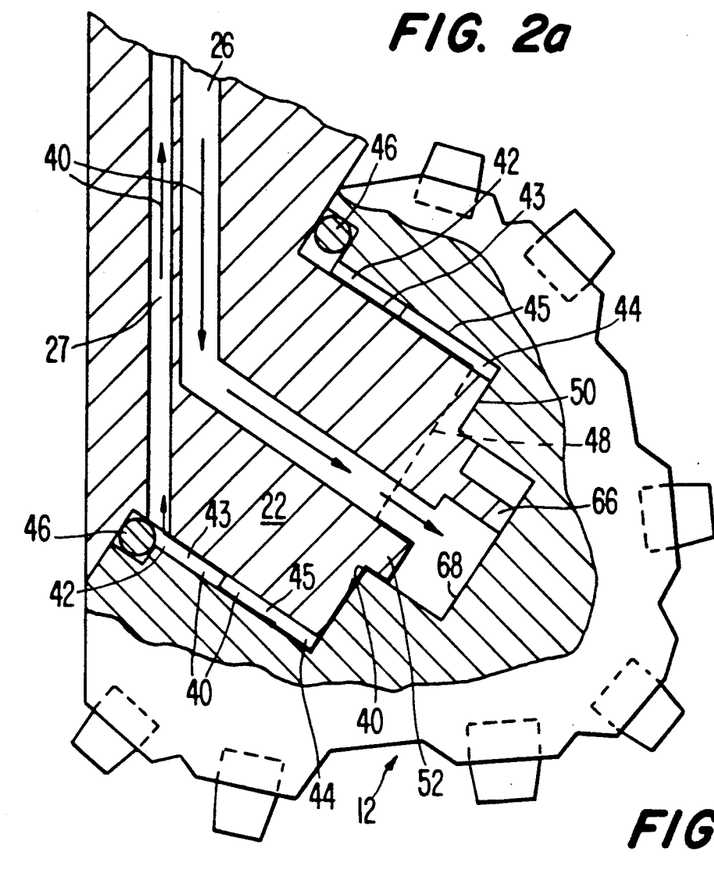
FIG. 2a is a partially cut away side cross-sectional view of a cutting cone illustrating the placement of one embodiment of the lubricant circulation pump of the present invention.

FIG. 2 illustrates in a broken side cross-sectional view, a single cone or cutting element 12 mounted in place on a journal leg 22. The circulation of lubricant from the lubricant supply (not shown) through the supply channel 26 to the cutting element bearing surfaces and back through return channel 27 to the lubricant supply is shown by the arrows 40.

The cutting element or cone 12 may be mounted on one or more bearing members, such as bearings 42 and 44, which are circumferentially positioned around the journal leg 22. Circumferential channels 43 and 45 may be provided in bearings 42 and 44, respectively to insure an adequate flow of lubricant to the bearing surfaces. A seal member 46 is typically provided with this type of bearing to prevent the leakage of lubricant from, and, therefore, inadequate lubrication of the bearings 42 and 44 during bit operation. Because the present system maintains positive pressure lubrication, as will be described in detail below, if a leak does occur, contaminants will be kept away from the bearing structures by the lubricant flow.

A bearing lubricant flow channel 48 shown in dashed lines is preferably provided near the top 50 of the journal leg 22 subjacent to the pilot pin 52 which secures the cone 12 on the journal leg 22. This channel directs lubricant to the cone bearings 42 and 44. Although they are not shown in FIG. 2a, two reservoirs, inlet reservoir 70 and outlet reservoir 72 shown in FIGS. 3a—d, 4 and 5, may be provided to facilitate lubricant flow to a lubricant pumping assembly.

Figure 2B:
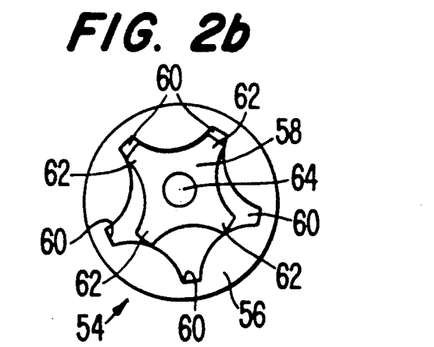
FIG. 2b is an end elevational view of a rotary lubricant pumping assembly of the present invention.

A rotary lubricant pumping assembly 54, shown in top view in FIG. 2b, is provided to pump the lubricant along the path of arrows 40. This pumping assembly includes two rotors 56 and 58 of the type known as gerotors. The outer gerotor 56 has a substantially circular smooth outer circumference. A plurality of recesses 60 is spaced about the inner circumference of the outer gerotor. The inner gerotor 58 has a toothed configuration which includes a plurality of projections 62 which are complementarily configured to fit into the recesses 60, leaving only a desired clearance, during operation of the assembly. The inner gerotor will have one less projection 62 than the number of recesses 60 in the outer gerotor. The inner gerotor also includes a central bore 64 which engages a gerotor pin or support element 66 that extends from the cone pilot pin 52.

In the embodiment illustrated in FIG. 2a-b, the outer gerotor 56 is attached to the cone 12. This is accomplished by inserting the outer gerotor 56 into recess 68 in the cone. The method of attachment can be by press or shrink fitting, welding or screwing the gerotor into the cone. Any other attachment method which secures the outer gerotor to the interior of the cone so that this gerotor can rotate with the cone can also be used. The outer gerotor will have a diameter that is substantially the same as or very slightly smaller than the diameter of recess 68 to permit its secure attachment to the cone. In addition, the outer gerotor 56 has the same center and axis of rotation as the cone 12. Because the outer gerotor is both fixed to and concentric with the cone, it will rotate at the same speed as the cone about the same axis of rotation.

The inner gerotor 58 is eccentric to both the cone 12 and outer gerotor 56 and rotates about an axis defined by the center of the gerotor support element 66 on the journal leg pilot pin 52. Rotation of the cone 12 and, simultaneously, the outer gerotor 56 during bit operation imparts rotational energy to the inner gerotor 58 and causes it to rotate eccentrically relative to the cone and outer gerotor. The relative rotation of the inner and outer gerotors 56 and 58 produces a pumping action which circulates lubricant in a manner which will be discussed in detail hereinbelow.

A bearing element (not shown) is preferably provided around the gerotor pin or support element 66. Other bearing elements may also be provided in or about the pilot pin as required to insure effective rotation of the cone and gerotors.

FIGS. 3a to 3d illustrate the pumping action of the lubricant pumping assembly 54 created by the rotation of the inner and outer gerotors relative to each other. The same embodiment of the lubricant pumping assembly 54 shown in FIG. 2 is also shown in FIGS. 3a to 3d. Both the outer gerotor 56 and the inner gerotor 58 are mounted on fixed centers; however, these centers are eccentric to each other so that each gerotor rotates about a different axis of rotation.

Figure 4:
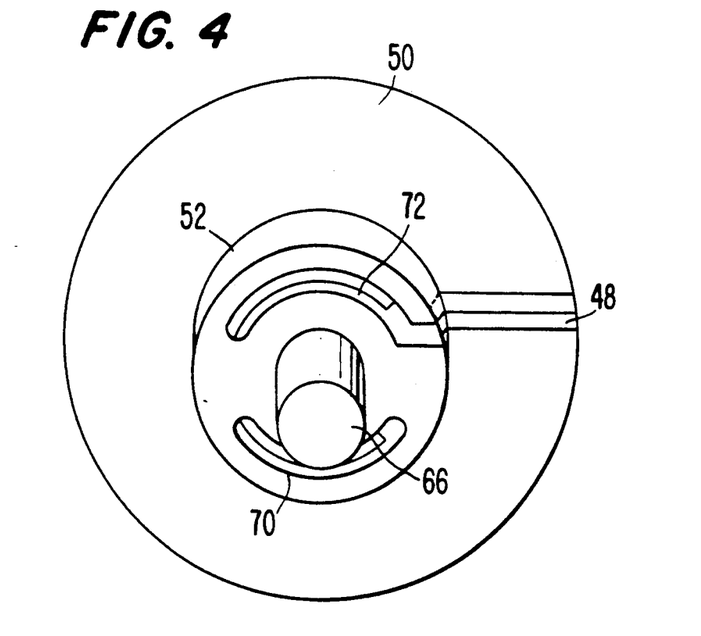
FIG. 4 is a front view of the drill bit cutting element pilot pin/thrust face including lubrication reservoirs according to the present invention.

Each drill bit journal leg 22 is preferably provided with a lubricant inlet reservoir 70 and a lubricant reservoir outlet 72, which can be clearly seen in FIG. 4. A gerotor type of pump transfers lubricant from the inlet to the outlet side of the pump as it is trapped between cavities formed by the rotating of the inner and outer gerotors. During the first 180° of rotation, the cavity between the inner gerotor teeth and outer gerotor recesses gradually increases in size until it reaches a maximum volume, which is equivalent to the full volume of the projection or tooth missing from the inner gerotor. The inner gerotor will always have one less projection or tooth than the number of recesses of the outer gerotor. The gradually enlarging cavity between the inner and outer gerotors creates a vacuum, which causes lubricant to flow into the cavity from the inlet reservoir 70. It is then forced out through the lubricant outlet reservoir 72 as the size of the cavity decreases during the next 180° of rotation.

FIGS. 3a to 3d illustrate the relative positions of the inner gerotor and the outer gerotor and the movement of lubricant during rotation of the gerotors from the inlet to the outlet side of the lubricant pumping assembly. The darkened area 74 in each of these figures represents lubricant circulating through the pump. The outer gerotor rotates in the direction of arrow 57, and the inner gerotor rotates in the direction of the arrow 59. The rotation of the inner gerotor relative to the outer gerotor can be clearly demonstrated by comparing the relative positions of marker 56a on the outer gerotor and marker 58a on the inner gerotor in each of FIGS. 3a-d.

Figure 3A:
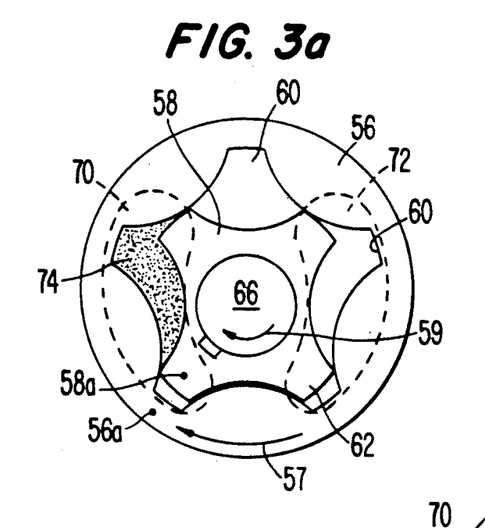
FIG. 3a to 3d illustrate the FIG. 2a embodiment of the lubricant circulation pump of the present invention during rotation of the cutting element.
Figure 3B:
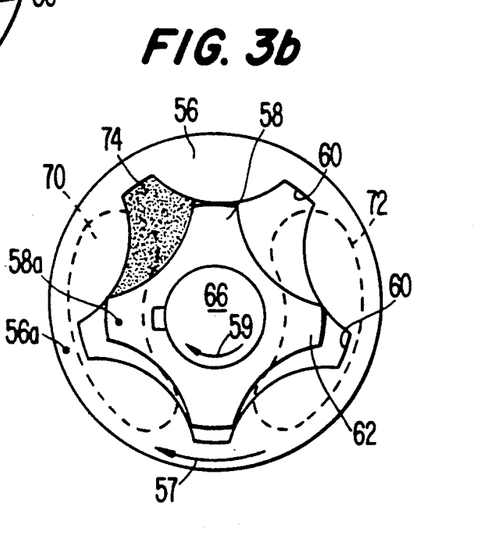
Figure 3C:
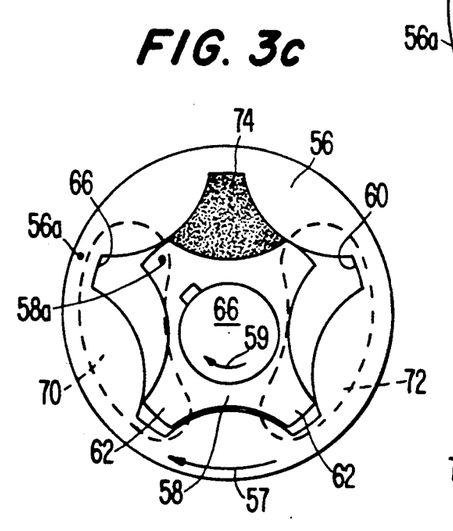

In FIG. 3a, lubricant fills the space between the inner and outer gerotors that is directly over the lubricant inlet reservoir 70. In FIG. 3b, lubricant 74 is drawn into the cavity between the teeth as the inner gerotor is caused to rotate by the rotation of the outer gerotor. In FIG. 3c, the cavity formed by the space between two of the projections or teeth 62 of the inner gerotor and a recess 60 of the outer gerotor has reached its maximum volume, which is equivalent to the volume of the tooth or projection which would otherwise have filled the space. Lubricant 74 is trapped in this cavity.

Figure 3D:
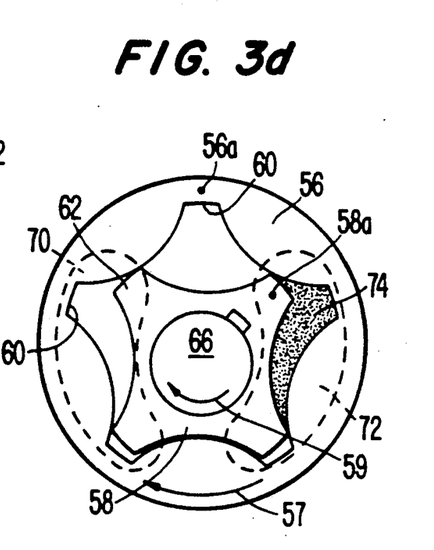

In FIG. 3d, rotation of the gerotors has decreased the size of the cavity so that the lubricant 74 is forced out into the lubricant outlet reservoir 72. From the outlet 72 lubricant flows over the cone bearing elements 42 and 44 (FIG. 2a) along the path shown by arrows 40 to the lubricant return channel 27. The lubricant is then preferably filtered, returned to the lubricant supply and recirculated through the lubricant supply channel 26 to the lubricant inlet reservoir 70 and the rotating inner and outer gerotors. This lubricant circulation and flow pattern are repeated without interruption during bit operation to insure a constant flow of circulating lubricant to the drill bit bearing surfaces. In addition to keeping the bearing surfaces well lubricated, this forced flow of lubricant by the lubricant circulation assembly of the present invention effectively washes away particles of rock, dirt and the like that would otherwise be a major contributor of bearing wear.

FIG. 4 illustrates the bit journal leg face 50 and shows the cone or cutting element pilot pin 52, the lubricant flow channel 48, lubricant inlet reservoir 70, and lubricant outlet reservoir 72. The eccentric position of the gerotor pin 66 relative to the cone pilot pin 52 is also shown in FIG. 4.

Figure 5:
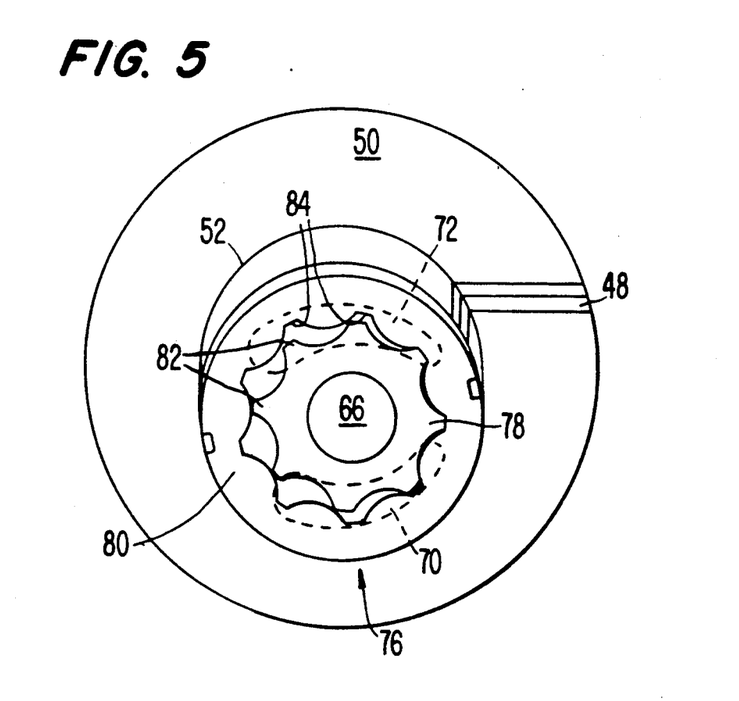
FIG. 5 illustrates the drill bit cutting element pilot pin/thrust face of FIG. 4 with a second embodiment of the present lubricant circulating pump mounted in place.

FIG. 5 illustrates a second embodiment of lubricant pumping assembly 76 according to the present invention. This assembly, like assembly 54 of the embodiment shown in FIG. 2b and 3a-d, includes an inner gerotor 78 mounted eccentrically to an outer gerotor 80. These gerotors have a slightly different tooth and recess configuration than the first embodiment. However, the inner gerotor 78 still has one less tooth or projection 82 (n−1) than the number (n) of recesses 84 in the outer gerotor 80.

The gerotor assembly 76 of FIG. 5 has a greater number of recesses than does the gerotor assembly 54 of FIGS. 2b and 3a-d. The specific gerotor configuration selected will depend, in part, on the volume of lubricant to be circulated through the assembly, as will be discussed below in connection with FIG. 8. Although the two gerotor configurations illustrated have angular, squared off teeth and corresponding recesses, these structures may also be curved so that the tips of the teeth or projections of the inner gerotor have a smooth profile. The recesses of the outer gerotor are then correspondingly curved to provide minimal tip clearance.

In the FIG. 5 embodiment, the outer gerotor 80 is fixed to the cone (not shown), while the inner gerotor "freewheels" or rotates freely about the pin 66.

Figure 6:
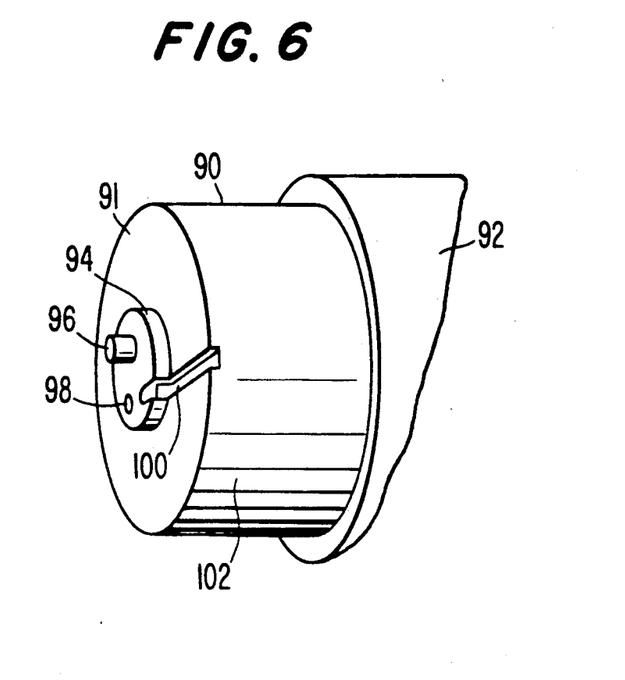
FIG. 6 illustrates a bearing for a freewheel mounting of the inner gerotor of the present lubricant circulating pump.
Figure 7:
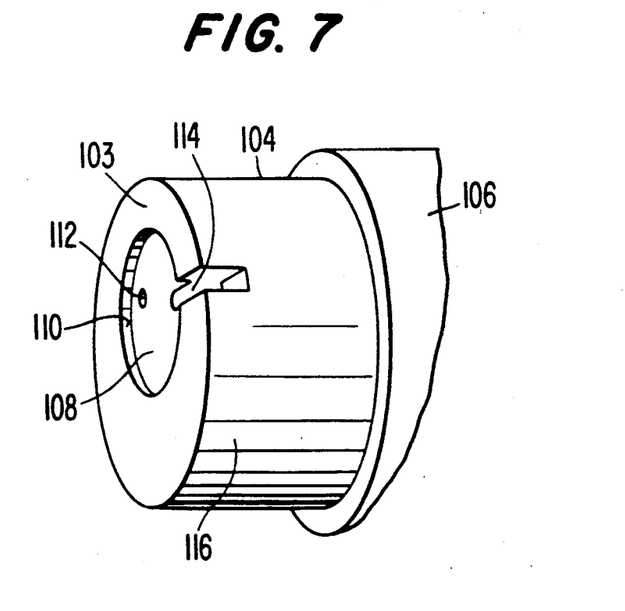
FIG. 7 illustrates a bearing for a freewheel mounting of the outer gerotor of the present lubricant circulating pump.

FIGS. 6 and 7 illustrate, in side perspective view, two mounting embodiments for mounting the present lubricant circulation assembly on the journal leg of a rock drill bit body so that the gerotor or pumping assembly of the present invention can be driven in one of two ways. In the first, which has been described above in connection with FIGS. 2a-2b, the outer gerotor is secured to the cutting cone so that it rotates with the cone during bit operation and about the same axis of rotation. The rotation of the outer gerotor imparts rotational energy and movement to the eccentrically mounted inner gerotor so that it also rotates relative to the outer gerotor as shown in FIGS. 3a-3 d, but about a different axis of rotation.

FIG. 6 shows an embodiment of mounting structure that will allow the inner gerotor to rotate freely or freewheel as the outer gerotor rotates. The journal leg 90 is shown in side perspective view mounted on the rock drill bit body 92. The pilot pin 94 on which the cutting cone (not shown) is mounted is positioned on the face 91 substantially in the center of the journal leg and coaxial with the journal leg central axis. Positioned eccentrically to the central axis of the pilot pin 94 and journal leg 90 is an inner gerotor bearing pin 96. A lubricant inlet channel 98, which has a different configuration than that shown in FIGS. 3a-3d and 4, directs lubricant from the lubricant supply (not shown) to the gerotor pump (not shown). A lubricant outlet channel 100 directs lubricant to the cutter cone bearing surfaces 91, 102 of the journal leg.

FIG. 7 illustrates, also in side perspective view, an embodiment of mounting structure that will allow the inner gerotor to be driven by and rotate with the cutting cone while the outer gerotor is allowed to rotate freely or freewheel and derives its rotational energy from the rotatingly driven inner gerotor. The journal leg 104 in FIG. 7 is attached to the rock drill bit body 106. In this embodiment, the inner gerotor (not shown) is positioned relative to the cutting cone (not shown) so that the inner gerotor and the cutting cone have substantially the same center and axis of rotation. These structures also have the same central axis as the journal leg 104. A gerotor cavity 108 is formed in the face 103 of the journal leg. The cavity 108 is located eccentric to the center of the journal leg and will preferably have the same substantially cylindrical configuration as the outer gerotor. The dimensions of the cavity 108 will be selected to provide sufficient clearance so that the outer gerotor can rotate freely within the cavity. The circumferential wall 110 of the cavity is preferably substantially the same height as the height of the outer gerotor (not shown) so that the outer surface of the outer gerotor is flush with the journal leg face 103. The wall 110 functions as a bearing for the outer gerotor. A lubricant inlet channel 112 supplies lubricant to the gerotor pump, and a lubricant outlet channel 114 directs lubricant to the cutter cone bearing surfaces 103, 116 of the journal leg 106.

The placement of the gerotor pumping assembly within the cutting cone pilot pin bore as shown in FIGS. 2a-2b and 6 or recessed in the face of the journal leg as shown in FIG. 7 effectively utilizes the maximum amount of available space. Moreover, this assembly requires only a minimum number of additional parts beyond those already required for effective operation of the drill bit cutting elements.

The lubricant circulating system of the present invention has been described as a lubricant recirculation system wherein lubricant is returned to a reservoir for reuse. However, the present invention also encompasses a lubricant circulating assembly including only a lubricant inlet and a gerotor pumping assembly. In this arrangement the spent lubricant is not recirculated and reused but, instead, washes debris out of the journal area and into the drilling cuttings for return to the hole surface.

Moreover, different arrangements of lubricant reservoirs and lubricant supply inlets are possible with the present invention. For example, a single lubricant reservoir can be centrally located to hold lubricant for circulation by all of the lubricant circulating pumps in the bit. Typically, one circulating pump will be operatively associated with each cutter cone, and all pumps could share a common reservoir. Alternatively, each circulating pump could include its own lubricant reservoir. Another arrangement within the scope of the present invention includes a reservoir that is not part of the bit, but is fluidically connected with the lubricant inlet supply channel. A system which fully recirculates the lubricant will also include a return channel. A separate return channel can be provided for each lubricant circulating pump, particularly when a common reservoir is provided. It is also possible to eliminate the return channel entirely. If this is done, after it leaves the lubricant circulating pump, lubricant will simply seep past the bearing structures, which, optionally, include an accommodating bearing seal. Other arrangements of reservoirs, channels and lubricant supplies which provide lubricant to the rotary pump described herein to circulate lubricant over the bit bearings are also contemplated to be within the scope of the present invention.

The lubricant circulation assembly of the present invention provides other benefits as well. Because the lubricant circulates as described, auxiliary lubricating and lubrication treating devices such as heat exchangers, filters and additional reservoirs, may be readily incorporated into the assembly as required by the particular bit application. Pumping action of the assembly and lubricant flow are based solely upon bearing movement and do not depend on temperature, pressure or energy inducing devices. The lubricant recirculation assembly is capable of running at a high number of revolutions per minute (rpms) and can withstand the rpm level delivered by down hole turbines. Additionally, the performance of the pump will not deteriorate, and bearing wear can be aligned with pump wear to reduce pump blow-by after extended service.

The pumping action of and lubricant flow of the present lubricant circulation assembly is directly related to bearing rotational velocity. The same volume of lubricant is pumped through the bearing in each revolution. Consequently, as the number of revolutions per minute increases, the amount of lubricant pumped increases linearly with respect to the increase in rpms. The circulating lubricant volume produced by the gerotor embodiment of FIGS. 2b and 3a-3d can be calculated with reference to FIG. 8.

The actual diameter of a working embodiment of the gerotor assembly of FIGS. 3a-3d would be about 1 inch for a 7⅞ inch rock drill bit. The 1 inch diameter outer gerotor would be pressed, shrink fitted, welded, screwed or otherwise secured in the pilot pin bore of the cutting cone. Alternatively, the outer gerotor could be attached to the thrust face assembly. The lubricant trapped in area 74 of FIG. 3c represents the maximum quantity of circulating lubricant since the cavity created by the relative rotation of the inner and outer gerotors and is approximately equal to the volume of the "missing" tooth or projection on the inner gerotor 58.

Figure 8:
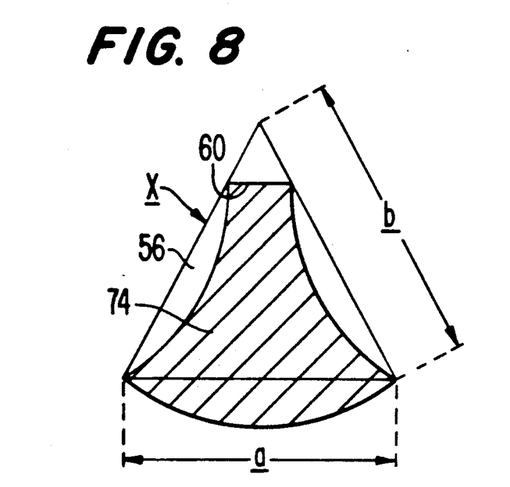
FIG. 8 illustrates schematically the volume of oil trapped in one cavity formed by the relative rotation of the inner and outer gerotors.

FIG. 8 schematically illustrates this volume, which can be approximated using a triangle X constructed as shown and having a base of dimension a and two sides of dimension b. The area of the triangle is calculated according to the following formula:

$$\text{Area} = \frac{a}{2} \times \sqrt{b^2 - \left(\frac{a}{2}\right)^2}$$

When the outer gerotor has a diameter of 1 inch, a=0.357 inch and b=0.321 inch. The area will then be 0.0476 square inch. If the gerotor height is ⅜ inch, which is also the height of the lubricant-filled cavity, the volume of lubricant will be approximately 0.02975 cubic inch. (Area of triangle X multiplied by the height).

This volume will be pumped five times in one cone revolution by the gerotor pumping assembly 54 of FIGS. 2b and 3a-3d. The outer gerotor 56 has five recesses, each of which will form a cavity approximately equal to the volume of the "missing" inner gerotor tooth into which lubricant will be forced by the relative rotation of the inner and outer gerotors during one cone revolution. This same volume will be pumped 7½ times in one bit revolution. Using the dimensions described above, the volume of lubricant pumped per cone revolution is 0.149 cubic inch, and the volume of lubricant pumped per bit revolution is 0.223 cubic inch.

If the clearance between the cone and the bearings 42, 44 (FIG. 2a) is 0.003 inch, the following volume in the bearings is filled with recirculating lubricant:

$$\left(\begin{array}{c}\text{Area of bearing} \\ \text{outer face}\end{array} - \begin{array}{c}\text{Area of cone} \\ \text{inner face}\end{array}\right) \times \text{Depth of Journal}$$

Therefore, the load bearing area of each journal leg and cutter cone assembly would have nine times its volume of lubricant displaced with each cone revolution. Thirteen times its volume of lubricant would be displaced with each bit revolution.

If the lubricant supply reservoir 24 (FIG. 1), has a substantially cylindrical configuration with a height of 2 inches and a diameter of 1½ inches, it will hold 3.53 cubic inches of lubricant using the dimensions described above. All of this lubricant will circulate through the journal bearings in 23 cone revolutions or in 16 bit revolutions. If the bit rotates at 60 revolutions per minute, the quantity of lubricant in the lubricant supply will completely recirculate from the lubricant supply 24 through the supply channel 26 to the gerotor assembly 54, through the gerotor assembly 54 and along the path of arrows 40 (FIG. 2a) over the bearings 42, 44, through the lubricant return channel 27 and back to the lubricant supply in 16 seconds. This constant circulation not only reduces lubricant breakdown, but also washes away lubricant contaminants. Moreover, because this circulation is a positive pressure lubrication system, if a leak develops in the seal 46, rock particles, dirt and other contaminants will not enter the system; rather, lubricant will flow out. Additionally, the constant circulation of lubricant increases bearing life so that bearing failure in a rock drill bit incorporating the present circulation assembly will not be a likely contribution to bit failure.

The lubricant circulation system has been described herein only with respect to a single journal leg and cutter cone of a rock drill bit. Each journal leg and cutter cone, however, would include a similar system so that all of the rock drill bit bearing structures are constantly bathed with a circulating flow of lubricant. The rock drill bit shown in FIG. 1 has three cutter cones and would, therefore, have three separate lubricant circulation systems according to the present invention. Other types of rock drill bits which have a different number of cutter cones will optimally require one system for each cutter cone to achieve the increased bit life produced by incorporating the present system into the rock drill bit.

INDUSTRIAL APPLICABILITY

The lubricant circulation system of the present invention will find its primary application in petroleum drilling and like industries in a rock drill bit of the type employing rotating cutting elements or cones rotatably mounted on the bearing structure of a journal leg portion of the bit body.

I claim:

1. A rock drill bit including a lubricant circulation assembly for circulating lubricant across bearing surfaces in a cutting element of the rock drill bit, said lubricant circulation assembly comprising:
   (a) lubricant supply channel means for directing lubricant to the circulation assembly; and
   (b) rotary lubricant pump means powered by rotation of the cutting element for pumping lubricant from the lubricant supply channel means through a fluid circuit including the supply channel means and the bearing surfaces, said lubricant pump means including a pair of nested eccentric rotor means, one of said rotor means being concentric with the cutting element and rotating with said cutting element, for moving lubricant through said fluid circuit by forming cavity means including a series of variable volume cavities in said pump means for temporarily holding and then forcibly ejecting a defined quantity of lubricant from each cavity as the cutting element rotates.

2. The rock drill bit described in claim 1, wherein said rotor means comprises an outer gerotor configured to receive an inner gerotor so that relative rotation of said outer gerotor and said inner gerotor forms said variable volume cavities and causes a quantity of lubricant to be pumped from the lubricant supply channel means through said cavities to the bearing surfaces.

3. The rock drill bit described in claim 2, wherein said outer gerotor includes a number n of spaced circumferentially positioned recesses and said inner gerotor includes a number n−1 of spaced, circumferentially positioned projections configured to be received in said recesses during the rotation of said rotor means to form said variable volume cavities.

4. The rock drill bit described in claim 3, wherein said outer gerotor is drivingly secured concentric to the center of the drill bit cutting element so that it is positively driven by rotation of the cutting element during bit operation while said inner gerotor rotates freely.

5. The lubricant rock drill bit described in claim 3, wherein said inner gerotor is drivingly secured concentric to the center of the drill bit cutting element so that it is positively driven by rotation of the cutting element during bit operation while said outer gerotor rotates freely.

6. The rock drill bit described in claim 1, wherein said assembly further includes reservoir means for holding a quantity of lubricant to be circulated over the cutting element bearing surfaces and lubricant feed means for providing a quantity of lubricant from said reservoir means to the rotary lubricant pump means.

7. The rock drill bit described in claim 1, wherein said assembly further includes reservoir means for holding a quantity of lubricant to be circulated over the cutting element bearing surfaces and lubricant feed means for providing a quantity of lubricant from said reservoir means to the rotary lubricant pump means and lubricant return means for directing lubricant from the bearing surfaces to said reservoir means.

8. The rock drill bit described in claim 1, wherein said lubricant supply channel means is located internally in journal means for supporting the drill bit cutting element.

9. The rock drill bit described in claim 8, wherein the journal means includes pilot pin means coaxial with a central axis of the journal means for positioning the cutting element on the journal means and rotor means support means having a central axis different from the pilot pin central axis for supporting one of said rotor means eccentrically with respect to said cutting element.

10. The rock drill bit described in claim 3, wherein the configurations of said recesses and said projections cause said series of cavities to be temporarily formed between said inner gerotor and said outer gerotor during rotation of said rotor means and said quantity of lubricant to be pumped serially through each of said cavities to the bearing surfaces.

11. The rock drill bit described in claim 7, wherein said drill bit has multiple cutting elements and a reservoir means is fluidically associated with each cutting element.

12. The rock drill bit described in claim 6, wherein said drill bit has multiple cutting elements, and a single reservoir means is fluidically associated with all of said cutting elements.

13. The rock drill bit described in claim 12, wherein a lubricant return means is fluidically associated with each of said cutting elements.

14. The rock drill bit described in claim 13, wherein a single lubricant return means is fluidically associated with all of said cutting elements.

15. A rock drill bit including a plurality of cutting cones and a lubricant circulation system for forcibly lubricating bearing surfaces of each of the rotary cutting cones with a quantity of lubricant which is circulated from a cone lubricant supply to the cone bearing surfaces as the cone rotates, said lubricant circulation system including dual element rotary pump means for pumping said quantity of lubricant between the lubricant supply and the bearing surfaces, wherein a first pump means element is secured to the cone to be coaxial and concentric therewith so that said first pump means element rotates as the cone rotates and a second pump means element is located coplanar and eccentric to said first pump means element so that said first pump means element causes said second pump means element to rotate freely when said cone rotates to force said quantity of lubricant serially through a plurality of cavities temporarily formed between said pump elements, thereby pumping lubricant from the supply to the bearing surfaces during cone rotation.

16. A rock drill bit as described in claim 15, wherein said first pump means element is positioned circumferentially about said second pump means element and includes a plurality of spaced circumferential recesses adjacent to said second pump means element, said second pump means element includes a plurality of spaced circumferential projections corresponding in configuration to said recesses, and said cavities are temporarily formed by relative rotation of said recesses and said projections.

17. A rock drill bit as described in claim 15, wherein said second pump means element is positioned circumferentially about said first pump means element and includes a plurality of spaced circumferential recesses adjacent to said first pump means element, and said first pump means element includes a plurality of spaced circumferential projections corresponding in configuration to said recesses, and said cavities are temporarily formed by the relative rotation of said recesses and said projections.

18. A rock drill bit as described in claim 15, wherein said cavities vary in volume during rotation of said pump elements.

19. A rock drill bit as described in claim 18, wherein said quantity of lubricant has a volume approximately equal to the maximum volume of the largest of said cavities.

20. A rock drill bit as described in claim 15, wherein lubricant is recirculated back to the supply from the bearing surfaces during rotation of said cone.

21. A rotary rock drill bit including multiple cutting elements and a lubricant circulation assembly operatively associated with each cutting element for circulating lubricant across bearing surfaces of each of the cutting elements, said lubricant circulation assembly comprising:
(a) lubricant supply channel means for directing lubricant to the circulation assembly; and
(b) rotary lubricant pump means powered by rotation of the cutting element to pump lubricant from the lubricant supply channel means through a fluid circuit including the supply channel means and the bearing surfaces, said lubricant pump means including a pair of nested eccentric rotor means, one of said rotor means being concentric with the cutting element and rotating with said cutting element to move lubricant through said fluid circuit by forming cavity means including a series of variable volume cavities in said pump means for temporarily holding and then forcibly ejecting a defined quantity of lubricant from each said cavity as the cutting element rotates, wherein said assembly further includes reservoir means for holding a quantity of lubricant to be circulated over the cutting element bearing surfaces and lubricant feed means for providing a quantity of lubricant from said reservoir means to the rotary lubricant pump means.

* * * * *